US006855754B2

(12) United States Patent
Takamura et al.

(10) Patent No.: US 6,855,754 B2
(45) Date of Patent: Feb. 15, 2005

(54) ASPHALT-BASED FORMULATIONS AND METHOD OF MAKING AND USING THE SAME FOR PAVING AND COATING APPLICATIONS

(75) Inventors: Koichi Takamura, Charlotte, NC (US); Babak Golzar, Charlotte, NC (US); Vanessa Adams, Charlotte, NC (US); Patrick J. Mormile, Waxhaw, NC (US)

(73) Assignee: BASF AG, Ludwigshafen (DE)

( * ) Notice: Subject to any disclaimer, the term of this patent is extended or adjusted under 35 U.S.C. 154(b) by 97 days.

(21) Appl. No.: 10/332,894
(22) PCT Filed: Jun. 18, 2002
(86) PCT No.: PCT/US02/33343
§ 371 (c)(1), (2), (4) Date: Mar. 10, 2003
(87) PCT Pub. No.: WO02/50189
PCT Pub. Date: Jun. 27, 2002

(65) Prior Publication Data
US 2004/0014845 A1 Jan. 22, 2004

Related U.S. Application Data

(63) Continuation-in-part of application No. PCT/US01/44988, filed on Nov. 29, 2001, which is a continuation-in-part of application No. 09/790,273, filed on Feb. 21, 2001, now abandoned.
(60) Provisional application No. 60/256,709, filed on Dec. 18, 2000.

(51) Int. Cl.[7] .............................................. C08L 95/00
(52) U.S. Cl. ..................... 524/60; 106/277; 106/283; 106/284.02; 106/284.03; 106/284.04; 106/284.3; 524/61
(58) Field of Search ...................... 524/60–61; 106/277, 106/283, 284.02, 284.03, 284.04, 284.3

(56) References Cited

U.S. PATENT DOCUMENTS

| | | | |
|---|---|---|---|
| 3,220,953 A | * | 11/1965 | Borgfeldt ..................... 516/43 |
| 3,236,671 A | | 2/1966 | Dybalski et al. |
| 3,466,247 A | | 9/1969 | Ohtsuka et al. |
| 3,660,324 A | | 5/1972 | Onchi et al. |
| 3,689,297 A | * | 9/1972 | Dybalski et al. ............ 106/280 |
| 3,695,152 A | | 10/1972 | Graf ............................... 94/23 |
| 3,951,676 A | | 4/1976 | Elste, Jr. ...................... 106/277 |
| 4,296,207 A | | 10/1981 | Siegmund |
| 4,462,840 A | | 7/1984 | Schilling et al. |
| 4,597,799 A | | 7/1986 | Schilling |
| 4,772,648 A | | 9/1988 | Demangeon et al. |
| 4,921,892 A | | 5/1990 | Moore et al. |
| 4,944,804 A | | 7/1990 | Schilling |
| 5,160,453 A | | 11/1992 | Schilling |
| 5,268,029 A | | 12/1993 | Demangeon et al. |
| 5,443,632 A | | 8/1995 | Schilling |
| 5,667,718 A | | 9/1997 | Jones et al. |
| 5,843,222 A | | 12/1998 | Miller et al. |
| 5,928,418 A | * | 7/1999 | Tamaki et al. ............... 106/277 |

FOREIGN PATENT DOCUMENTS

| | | |
|---|---|---|
| GB | 2 151 640 A | 7/1985 |
| WO | WO02/024759 | 3/2002 |
| WO | WO03/000760 | 1/2003 |

OTHER PUBLICATIONS

Takamura, Koichi, *SBR Synthetic Latex in Paving Applications*, Biturnen Asia 2000, Jun. 20–21, Singapore.
Brown, S.F., *A Study of Cement Modified Bitumen Emulsion Mixtures*, pp. 92–121.
Wyoming Department of Transportation, Special Provision for Micro Surfacing, Nov. 18, 1998.

\* cited by examiner

*Primary Examiner*—Peter Szekely

(57) ABSTRACT

An asphalt-based, cold paving/coating formulation that provides increased flexibility with respect to the choice of aggregate types, asphalt emulsion types, type and amount of the surfactants used to produce the asphalt emulsion, asphalt emulsion pH's and application temperature's than conventional cold paving/coating formulations while providing good mix times and curing behavior. The asphalt-based formulation can be formed by mixing water; an asphalt emulsion; at least one first compound in aqueous solution selected from the group consisting of alkali metal salts, alkali metal hydroxides, ammonium salts, and ammonium hydroxide; at least one second compound in aqueous solution selected from the group consisting of Group IIA salts, Group IIIA salts, Group IIIB salts, copper salts, zinc salts, cadmium salts, manganese salts, iron salts, cobalt salts, and nickel salts; and optionally aggregate. Also, a method of preparing an asphalt-based formulation using these components.

40 Claims, No Drawings

ASPHALT-BASED FORMULATIONS AND METHOD OF MAKING AND USING THE SAME FOR PAVING AND COATING APPLICATIONS

This application is a National Stage application of PCT/US02/33343, filed 18 Jun. 2002 (18 Jun. 2002), which is a continuation-in-part of International Application No. PCT/US01/44988, which was filed on 29 Nov. 2001 (20 Nov. 2001), which is a CIP to U.S. Ser. No. 09/790,273, filed on 21 Feb. 2001 (21 Feb. 2001) now abandoned, and to U.S. Ser. No. 60/256,709, filed on 18 Dec. 2000 (18 Dec. 2000), and is a National Stage application of PCT/US01/44988, filed on 29 November 2001 (20 November 2001), all of which are incorporated herein by reference.

FIELD OF THE INVENTION

The present invention relates to asphalt-based formulations for paving and coating applications and particularly to asphalt-based paving formulations for use in cold paving applications such as microsurfacing and slurry seal applications and for coating substrates.

BACKGROUND OF THE INVENTION

There are two types of paving technologies used today for producing asphalt-based formulations for application to a surface to produce pavement: hot mix paving and cold paving. In hot mix paving, aggregates are heated to a temperature above 200° C. to remove residual water and mixed with molten asphalt at a temperature above 165° C. Because hot mix paving requires providing the aggregate and the asphalt at high temperatures, there are considerable energy requirements and cost associated with hot mix processes.

Cold paving does not involve heating the components used to produce the asphalt-based formulation. The typical cold paving method includes mixing aggregates with Portland cement or lime, wetting the aggregates with water, and adding an asphalt emulsion to the wetted mixture. These components are then vigorously mixed and applied to the road surface. For high traffic areas such as highways and major roads, the asphalt emulsion is typically modified through the use of a polymer such as a styrene-butadiene copolymer to increase the strength and durability of the paved surface. These formulations are commonly known as microsurfacing formulations. For low traffic areas such as small neighborhood roads, slurry seal formulations can be used without the need to modify the asphalt emulsion; however, the use of the polymer may still be desired.

Although there are numerous benefits associated with cold paving, including the reduced cost compared to hot mix paving, there are also problems associated with this method. For example, because Portland cement and lime are used as a fine powder, it is hard to accurately measure the amount needed for use in the cold paving formulation at the mixing truck. In addition, the fine Portland cement and lime powder can blow away when it is being mixed with the aggregate on top of the mixing truck.

Another problem associated with conventional cold paving formulations is that they are very sensitive to the application temperature. For example, in cold weather, the cohesion development of the formulation is slow and, as a result, long curing times exceeding an hour are necessary before the road can be opened to traffic. In hot weather, the formulation has a short mix time as defined by the period of time between the time the components are mixed and the time they must be applied to the road surface. Therefore, the formulation must be applied to the road surface quickly before the viscosity of the formulation increases to the point that it cannot be readily applied. Another problem with hot weather climates is that a formulation may work well in the cooler morning but by afternoon, when the temperature has increased, the asphalt emulsion breaks prematurely resulting in water breaking out of the formulation and accumulating between the old road surface and newly applied surface. This problem is known as the tenderness problem and results in the newly added pavement peeling off the existing surface once the road is opened to traffic.

Cold paving formulations are also very sensitive to the emulsion pH and acidity of the asphalt used in the formulations. Traditionally, an asphalt having a high acid number such as Venezuela asphalt has been used because it is difficult for the newly applied pavement to develop enough cohesion when a low acid number asphalt is used. Furthermore, asphalt emulsions having a low pH of 1.0 to 1.5 have been used because asphalt emulsions having higher pH's either result in a newly applied pavement that does not develop enough cohesion or that has very slow cohesion development. As a result, it takes more than one hour for the road to be available for traffic. Therefore, the types of asphalts that can be used for cold paving have traditionally been limited only to asphalts having high acid numbers and low emulsion pH's. Furthermore, there have been a lot of safety problems associated with low pH asphalt emulsions. For example, low pH asphalt emulsions can corrode or even eat through storage equipment.

Cold paving formulations are also sensitive to the type of aggregate used. In particular, aggregates may have different properties such as different fines contents and may interact with cationic surfactants present in the asphalt emulsion differently. Thus, the asphalt emulsion often must be modified such as by varying the use of certain surfactants to provide useful paving formulations.

There is a need in the art of paving formulations to produce a method and formulation for cold paving that is less sensitive to parameters such as aggregate types, the type of asphalt used to prepare the asphalt emulsion, the type and amount of the surfactants used in the asphalt emulsion, the emulsion pH and the application temperature. In addition, there is a need in the art to overcome the problems associated with the use and metering of Portland cement and lime for use in these formulations. There is also a need to produce a cold paving formulation that has a desirable mix time and good curing behavior.

SUMMARY OF THE INVENTION

The present invention includes an asphalt-based formulation formed by mixing water; an asphalt emulsion; at least one first compound selected from the group consisting of alkali metal salts, ammonium salts, alkali metal hydroxides and ammonium hydroxide; and preferably at least one second compound selected from the group consisting of Group IIA, Group IIIA, Group IIIB, copper, zinc, cadmium, manganese, iron, cobalt and nickel salts. Preferably, the asphalt-based formulation is produced by mixing from about 4 to about 16 parts by weight water, from about 8 to about 25 parts by weight of the asphalt emulsion, greater than 0 to about 4 parts by weight of the at least one first compound and greater than 0 to about 2 parts by weight of the at least one second compound. More preferably, the asphalt-based formulation is produced by mixing from about 8 to about 15 parts by weight water, from about 10 to about 15 parts by weight of the asphalt emulsion, from about 0.005 to about 3 parts by weight of the at least one first compound and from about 0.001 to about 1 part by weight of the at least one second compound. The at least one first compound is preferably selected from the group consisting of sodium salts, sodium hydroxide, potassium salts, potassium hydroxide, ammonium salts, and ammonium hydroxide. The at least one second compound is preferably selected from the group consisting of chlorides, sulfates and nitrates of the Group IIA elements, Group IIIA elements, Group IIIB elements, copper, zinc, cadmium, manganese, iron, cobalt and nickel. The at least one first compound and the at least one second compound are water-soluble and preferably have solubilities in water at 20° C. of greater than about 10 g/100 mL. The at least one first compound and the at least one second compound preferably react to produce at least one third compound having little or no solubility in water, e.g., a solubility in water at 20° C. of less than about 0.5 g/100 mL, such as a compound selected from the group of hydroxides and salts of the Group IIA elements, Group IIIA elements, Group IIIB elements, copper, zinc, cadmium, manganese, iron, cobalt and nickel. The formulation preferably has a pH of at least about 9.

In a preferred embodiment, the present invention further includes the asphalt-based formulation resulting from mixing the components described above, comprising water; asphalt dispersed in the water; at least one first compound selected from the group consisting of ammonium and alkali metal chlorides, ammonium and alkali metal nitrates, and ammonium and alkali metal sulfates; and at least one second compound preferably selected from the group consisting of salts and hydroxides of Group IIA elements, Group IIIA elements, Group IIIB elements, copper, zinc, cadmium, manganese, iron, cobalt and nickel, the at least one second compound having a solubility in water at 20° C. of less than about 0.5 g/100 mL. For example, the at least one second compound can be selected from the group consisting of salts and hydroxides of calcium, magnesium and aluminum. The formulation typically has a pH of at least about 9.

The present invention further includes a method of preparing an asphalt-based formulation, comprising mixing water, an asphalt emulsion, at least one first compound selected from the group consisting of alkali metal salts, ammonium salts, alkali metal hydroxides and ammonium hydroxide; and at least one second compound preferably selected from the group consisting of Group IIA, Group IIIA, Group IIIB, copper, zinc, cadmium, manganese, iron, cobalt and nickel salts. Preferably, the asphalt-based formulation is prepared by mixing from about 4 to about 16 parts by weight water, from about 8 to about 25 parts by weight of the asphalt emulsion, greater than 0 to about 4 parts by weight of the at least one first compound and greater than 0 to about 2 parts by weight of the at least one second compound. More preferably, the asphalt-based formulation is prepared by mixing from about 8 to about 15 parts by weight water, from about 10 to about 15 parts by weight of the asphalt emulsion, from about 0.005 to about 3 parts by weight of the at least one first compound and from about 0.001 to about 1 part by weight of the at least one second compound. Preferably, the at least one first compound includes a compound (e.g. sodium hydroxide) capable of producing a pH in solution of at least about 9 and a sufficient amount of the compound is mixed in the formulation to produce a pH of at least about 9.

The formulation of the invention can be prepared by mixing an aqueous solution of the at least one first compound and an aqueous solution of the at least one second compound with water to produce a mixture, and mixing the mixture with the asphalt emulsion to produce the asphalt-based formulation. Alternatively, the formulation can be prepared by mixing an aqueous solution of the at least one first compound with the water to produce a mixture, and mixing the mixture with the asphalt emulsion and an aqueous solution of at least one second compound to produce the asphalt-based formulation, preferably by including the at least one second compound in the aqueous phase of the asphalt emulsion. The formulation can also be prepared by mixing the asphalt emulsion and an aqueous solution of at least one second compound with the water to produce a mixture, and mixing the mixture with an aqueous solution of the at least one first compound to produce the asphalt-based formulation.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. In this specification, ranges are given for various properties. The range given for each property is a shorthand description of every value within the range. The end of the ranges can be selected to be any value that is within the stated range.

The present invention comprises an asphalt-based, cold paving formulation and/or coating formulation that provides increased flexibility with respect to the choice of aggregate types, asphalt types and the amount and types of surfactants used to produce the asphalt emulsions, asphalt emulsion pH's and application temperatures than conventional cold paving and coating formulations while providing good mix times and curing behavior. In addition, Portland cement, lime and other fine powder ingredients are not used to produce the formulation of the present invention and thus the problems associated with using fine powders such as metering fine powders are not present in the formulation of the invention. Therefore, with the exception of aggregate, the components used to produce the formulation are preferably provided in liquid form and can be easily metered for use in the formulation.

The present invention includes an asphalt-based formulation formed by mixing aggregate, water, an asphalt emulsion, at least one first compound selected from the group consisting of alkali metal salts, ammonium salts, alkali metal hydroxides and ammonium hydroxide; and at least one second compound preferably selected from the group consisting of Group IIA, Group IIIA, Group IIIB, copper, zinc, cadmium, manganese, iron, cobalt and nickel salts. Applicants have discovered that by combining alkali metal or ammonium salts or hydroxides in solution, and one or more salts such as a Group IIA, Group IIIA, Group IIIB, copper, zinc, cadmium, manganese, iron, cobalt or nickel salts in solution, that an asphalt-based formulation suitable for cold paving can be produced without the need to use Portland cement, lime, or other fine powder ingredients. Furthermore, because these compounds are provided in aqueous solution, the present invention avoids the problem associated with using Portland cement and lime of metering fine powders when these powders are mixed on-site in the mixing truck.

The asphalt-based formulations of the invention can be used for various cold paving applications. For example, these formulations can be used for microsurfacing in high traffic areas such as highways and major roads to produce a strong, durable pavement. These formulations can also be used for slurry seal applications where the strength and durability requirements are not as important, e.g., in low traffic areas such as small neighborhood roads.

In accordance with the invention, the present formulation includes aggregate in an amount of 100 parts by weight. Preferably, for microsurfacing applications, the aggregate is an ISSA Type II or III aggregate. For slurry seal applications, the aggregate can be an ISSA Type I, II or III aggregate. Suitable aggregates for use in the invention include Delta aggregate and Transpcos aggregate (ISSA Type II aggregates commercially available from Capitol Aggregates) and Blue Circle aggregate (an ISSA Type II aggregate commercially available from Blue Circle). The aggregate is typically wetted with from about 4 to about 16 parts by weight water, more preferably, from about 8 to about 15 parts by weight water, prior to being combined with the other components of the formulation. The amount of water added is typically dependent on the fines content and their activity in the aggregate.

The formulation of the invention includes an asphalt (bitumen) emulsion, and the asphalt emulsion is preferably added to the formulation in an amount from about 8 to about 25 parts by weight, and more preferably in an amount from about 10 to about 15 parts by weight. Suitable asphalt emulsions for use in the invention include SS-1, SS-1 h, CSS-1, CSS-1 h, CQS-1 h and QS emulsions, particularly for slurry seal formulations. For microsurfacing applications, the asphalt emulsion is preferably a CSS-1 h emulsion that has been polymer-modified as discussed in more detail below. Preferably, the asphalt emulsions for use in the invention include between about 30 and about 80 percent bitumen, and more preferably, between about 65 and about 75 percent bitumen. The bitumen preferably has a mean particle diameter of about 1 to about 10 microns, more preferably, about 2 to about 3 microns. The asphalt emulsions conventionally used in cold paving applications have a pH in the range of 1.0 to 1.5 and are typically made with an asphalt having a high acid number. Typically, the pH of the asphalt emulsion is produced through the use of acids such as hydrochloric, phosphoric, sulfuric, acetic, formic and oxalic acids. It is well known in the art that asphalt emulsions having higher pH's have been known to either not develop enough cohesion or to have slow cohesion development resulting in increased curing time being needed before the newly paved surface can be opened to traffic. The asphalt emulsions used in accordance with the invention can have a pH in the range of 1.0 to 1.5 but pH's in this range are not required and asphalt emulsions having a pH of greater than 1.5, or even greater than 2.0 or 3.0, can be used in accordance with the invention. In addition, the asphalt formulations can include a surfactant and suitable surfactants are conventional in the art. Preferably, the asphalt emulsion adheres to the standards of the ASTM D977, ASTM D2397, AASHTO M140 and AASHTO M208.

The asphalt emulsion is typically prepared by first preparing a soap solution containing water and one or more surfactants, and then adjusting the pH of the soap solution using an acid such as HCl as mentioned above. The soap solution and preheated asphalt are then generally pumped into a colloid mill where high shear mixing produces the asphalt emulsion having asphalt droplets dispersed in the water.

Typically for microsurfacing formulations and optionally for slurry seal operations, the asphalt emulsions are polymer modified, e.g., to increase the strength and durability of the resulting asphalt-based, cold paving formulations and to decrease the curing times of these formulations. Typically, a polymer latex is added to the soap solution and the asphalt emulsion is produced as discussed above. Alternatively, the polymer latex can be added to the asphalt emulsion after it has been prepared or the polymer latex can be combined with the asphalt prior to mixing the asphalt with the soap solution to produce the asphalt emulsion.

Suitable polymer latices for use in microsurfacing formulations include cationic SBR (styrene-butadiene rubber) latices, natural rubber latices, and polychloroprene latices (e.g. NEOPRENE® latices available from E.I. Du Pont de Nemours). SBS (poly(styrene-butadiene-styrene)) block copolymers and EVA (ethylene-vinyl acetate) copolymers can also be used but typically must be added slowly to heated asphalt (e.g. 160–170° C.) and then subjected to high shear mixing to disperse the polymer in the asphalt prior to forming the asphalt emulsion. Preferably, a cationic SBR latex is used in the asphalt emulsion. The cationic SBR latex emulsion typically includes between about 0.1 and about 10%, and more preferably, between about 1.0% and about 4.0%, by weight cationic surfactants. The SBR latex emulsion is typically included in the asphalt emulsion in an amount from greater than 0 to about 6%, more preferably from 3.0 to 3.5% by weight. Suitable cationic SBR latices for use in the invention include BUTONAL®NX1118 and BUTONAL® NS 198, commercially available from BASF Corporation.

The present formulation is prepared by mixing at least one compound selected from the group consisting of alkali metal salts, alkali metal hydroxides, ammonium salts, and ammonium hydroxide in the formulation. The alkali metal and ammonium salts and hydroxides are preferably added to the formulation in aqueous solution in an amount from greater than 0 to about 4 parts by weight, more preferably, from about 0.005 to about 3 parts by weight (based on the weight of the salt or hydroxide and not the salt or hydroxide solution). Because the alkali metal and ammonium salts and hydroxides added to the formulation are added in aqueous solution, the salts and hydroxide of the invention are water-soluble and preferably have a solubility in water at 20° C. of greater than about 10 g/100 mL. The salts for use in the invention include but are not limited to sulfates, carbonates, silicates, phosphates, phosphites, borates, fluorides, sulfites, oxalates and citrates. Suitable alkali metal and ammonium salts and hydroxides for use in the invention include but are not limited to sodium hydroxide (NaOH), sodium sulfate ($Na_2SO_4$), sodium bisulfate ($NaHSO_4$), sodium carbonate ($Na_2CO_3$), sodium bicarbonate ($NaHCO_3$), sodium metasilicate ($Na_2SiO_3$), sodium disilicate ($Na_2Si_2O_5$), sodium orthosilicate ($Na_4SiO_4$), sodium orthophosphate ($Na_3PO_4$), disodium hydrogen phosphate ($Na_2HPO_4$), sodium dihydrogen phosphate ($NaH_2PO_4$), hexasodium metaphosphate (($NaPO_3)_6$), trisodium metaphosphate (($NaPO_3)_3$), sodium triphosphate ($Na_5P_3O_{10}$), sodium hypophosphite ($NaH_2PO_2$), sodium dihydrogen orthophosphite ($NaH_2PO_3$), sodium metaborate ($NaBO_2$), sodium sulfite ($Na_2SO_3$), sodium citrate ($Na_3C_6H^5O_7$), potassium hydroxide (KOH), potassium sulfate ($K_2SO_4$), potassium bisulfate ($KHSO_4$), potassium carbonate ($K_2CO_3$), potassium bicarbonate ($KHCO_3$), potassium sodium carbonate ($KNaCO_2$), potassium metasilicate ($K_2SiO_3$), potassium tetrasilicate ($K_2Si_4O_9$), potassium orthophosphate ($K_3PO_4$), dipotassium hydrogen phosphate ($K_2HPO_4$), potassium dihydrogen phosphate ($KH_2PO_4$), hexapotassium metaphosphate (($KPO_3)_6$), tetrapotassium metaphosphate (($KPO_3)_4$), potassium pyrophosphate ($K_4P_2O_7$), potassium subphosphate ($K_2PO_3$), potassium hypophosphite ($KH_2PO_2$), potassium dihydrogen orthophosphite ($KH_2PO_3$), potassium metaborate ($KBO_2$), potassium tetraborate ($K_2B_4O_7$), potassium fluoride (KF), potassium sulfite ($K_2SO_3$), potassium hydrogen sulfite ($KHSO_3$), potassium citrate ($K_3C_6H_5O_7$), monobasic potassium citrate ($KH_2C_6H_5O_7$), ammonium hydroxide ($NH_4OH$), ammonium sulfate (($NH_4)_2SO_4$), ammonium bisulfate ($NH_4HSO_4$), ammonium carbonate (($NH_4)_2CO_3$), ammonium bicarbonate ($NH_4HCO_3$), ammonium orthophosphate (($NH_4)_3PO_4$), diammonium hydrogen phosphate (($NH_4)_2HPO_4$), ammonium dihydrogen phosphate ($NH_4H_2PO_4$), ammonium sodium phosphate ($NaNH_4HPO_4$), ammonium hypophosphite ($NH_4H_2PO_2$), ammonium dihydrogen orthophosphite ($NH_4H_2PO_3$), ammonium fluoride ($NH_4F$), ammonium sulfite (($NH_4)_2SO_3$), ammonium bisulfite ($NH_4HSO_3$), ammonium binoxalate ($NH_4HC_2O_4$), diammonium citrate (($NH_4)_2HC_6H_5O_7$) and triammonium citrate (($NH_4)_3C_6H_5O_7$). Preferably, the alkali metal and ammonium salts and hydroxides are salts and hydroxides of sodium, potassium and ammonium and, more preferably, are hydroxides, sulfates, carbonates, silicates and phosphates of sodium, potassium and ammonium. In a preferred embodiment, the alkali metal and ammonium salts and hydroxides include sodium hydroxide. The alkali metal and ammonium salts and hydroxides can be provided in hydrated or anhydrous form for use in the invention.

The alkali metal and ammonium salts and hydroxides provide cations that react with the Group IIA, Group IIIA, Group IIIB, copper, zinc, cadmium, manganese, iron, cobalt and nickel salts preferably used in the invention as discussed below. Preferably, the alkali metal and ammonium salts and hydroxides are provided in stoichiometric excess with respect to these Group IIA, Group IIIA, Group IIIB, copper, zinc, cadmium, manganese, iron, cobalt and nickel salts. In addition, a sufficient amount of the alkali metal and ammonium salts and hydroxides are generally included to increase the pH of the overall formulation to a pH of at least about 9. If an alkali metal or ammonium salt is used that cannot produce the desired pH in solution such as the salt of a strong acid and strong base (e.g. sodium sulfate), at least one alkali metal or ammonium salt or hydroxide that provides alkalinity to the formulation, i.e., a base such as sodium hydroxide or the salt of a weak acid and strong base such as sodium carbonate, is preferably additionally included to provide the desired pH.

In accordance with the invention, at least one compound preferably selected from the group consisting of Group IIA (e.g. Be, Mg, Ca, Sr, Ba), Group IIIA (e.g. Sc, La), Group IIIB (e.g. Al, Ga, In), copper, zinc, cadmium, manganese, iron, cobalt and nickel salts is also added to the formulation. In addition, water-soluble salts having other cations can be used in accordance with the invention that react with the alkali metal and ammonium salts and hydroxides to produce a salt or hydroxide having a solubility in water at 20° C. of less than about 0.5 g/100 mL. The Group IIA, Group IIIA, Group IIIB, copper, zinc, cadmium, manganese, iron, cobalt and nickel salts are preferably added to the formulation in aqueous solution in an amount from greater than 0 to about 2 parts by weight, more preferably, in an amount from about 0.001 to about 1 part by weight (based on the weight of the salt). For example, the Group IIA, Group IIIA, Group IIIB, copper, zinc, cadmium, manganese, iron, cobalt and nickel salts can be provided in the aqueous phase of the asphalt emulsion. The Group IIA, Group IIIA, Group IIIB, copper, zinc, cadmium, manganese, iron, cobalt and nickel salts added to the formulation of the invention are water-soluble and preferably have a solubility in water at 20° C. of greater than about 10 g/100 mL. For example, the Group IIA, Group IIIA, Group IIIB, copper, zinc, cadmium, manganese, iron, cobalt and nickel salts can be chlorides, sulfates or nitrates. Suitable Group IIA, Group IIIA, Group IIIB, copper, zinc, cadmium, manganese, iron, cobalt and nickel salts include but are not limited to calcium chloride ($CaCl_2$), calcium nitrate ($Ca(NO_3)_2$), magnesium chloride ($MgCl_2$), magnesium nitrate ($Mg(NO_3)_2$), magnesium sulfate ($MgSO_4$), aluminum chloride ($AlCl_3$), aluminum nitrate ($Al(NO_3)_3$), aluminum sulfate ($Al_2(SO_4)_3$), beryllium chloride ($BeCl_2$), beryllium nitrate ($Be(NO_3)_2$), beryllium sulfate ($BeSO_4$), copper (II) chloride ($CuCl_2$), copper (II) nitrate ($Cu(NO_3)_2$), copper (II) sulfate ($CuSO_4$), strontium chloride ($SrCl_2$), strontium nitrate ($Sr(NO_3)_2$), barium chloride ($BaCl_2$), barium nitrate ($Ba(NO_3)_2$), zinc chloride ($ZnCl_2$), zinc nitrate ($Zn(NO_3)_2$), zinc sulfate ($ZnSO_4$), cadmium chloride ($CdCl_2$), cadmium nitrate ($Cd(NO_3)_2$), cadmium sulfate ($CdSO_4$), scandium chloride ($ScCl_3$), scandium nitrate; (Sc$(NO_3)_3$), scandium sulfate ($Sc_2(SO_4)_3$), gallium chloride ($GaCl_3$), gallium nitrate ($Ga(NO_3)_3$), gallium sulfate ($Ga_2(SO_4)_3$), indium chloride ($InCl_3$), indium nitrate ($In(NO_3)_3$), indium sulfate ($In_2(SO_4)_3$), lanthanum chloride ($LaCl_3$), lanthanum nitrate ($La(NO_3)_3$), manganese (II) chloride ($MnCl_2$), manganese (II) nitrate ($Mn(NO_3)_2$), manganese (II) sulfate ($MnSO_4$), iron (II) chloride ($FeCl_2$), iron (II) nitrate ($Fe(NO_3)_2$), iron (II) sulfate ($FeSO_4$), iron (III) chloride ($FeCl_3$), iron (III) nitrate ($Fe(NO_3)_3$), iron (III) sulfate ($Fe_2(SO_4)_3$), cobalt (II) chloride ($CoCl_2$), cobalt (II) nitrate ($Co(NO_3)_2$), cobalt (II) sulfate ($CoSO_4$), cobalt (III) chloride ($CoCl_3$), nickel chloride ($NiCl_2$), nickel nitrate ($Ni(NO_3)_2$), and nickel sulfate ($NiSO_4$). Preferably, the Group IIA, Group IIIA, Group IIIB, copper, zinc, cadmium, manganese, iron, cobalt and nickel salts are calcium, magnesium or aluminum salts such as calcium chloride ($CaCl_2$), calcium nitrate ($Ca(NO_3)_2$), magnesium chloride ($MgCl_2$), magnesium nitrate ($Mg(NO_3)_2$), magnesium sulfate ($MgSO_4$), aluminum chloride ($AlCl_3$), aluminum nitrate ($Al(NO_3)_3$), and aluminum sulfate ($Al_2(SO_4)_3$). More preferably, the Group IIA, Group IIIA, Group IIIB, copper, zinc, cadmium, manganese, iron, cobalt and nickel salts include calcium chloride or calcium nitrate. The Group IIA, Group IIIA, Group IIIB, copper, zinc, cadmium, manganese, iron, cobalt and nickel salts can be provided in hydrated or anhydrous form for use in the invention.

The alkali metal and ammonium salts and hydroxides added to the formulation react with the Group IIA, Group IIIA, Group IIIB, copper, zinc, cadmium, manganese, iron, cobalt and nickel salts added to the formulation to produce at least one Group IIA, Group IIIA, Group IIIB, copper, zinc, cadmium, manganese, iron, cobalt or nickel salt or hydroxide having a low solubility in water (if any). Preferably, the Group IIA, Group IIIA, Group IIIB, copper, zinc, cadmium, manganese, iron, cobalt and nickel salts or hydroxides produced by the reaction have a solubility in water at 20° C. of less than about 0.5 g/100 mL. For example, the Group IIA, Group IIIA, Group IIIB, copper, zinc, cadmium, manganese, iron, cobalt and nickel salts and hydroxides produced by the reaction of the salts added to the formulation include but are not limited to calcium hydroxide (Ca(OH)$_2$), calcium sulfate (CaSO$_4$), calcium carbonate (CaCO$_3$), calcium metasilicate (CaSiO$_3$), calcium orthosilicate (Ca$_2$SiO$_4$), tricalcium silicate (3CaO.SiO$_2$), calcium orthophosphate (Ca$_3$(PO$_4$)$_2$), dicalcium orthophosphate (CaHPO$_4$), monocalcium orthophosphate (Ca(H$_2$PO$_4$)$_2$), calcium hypophosphate (Ca$_2$P$_2$O$_6$), calcium metaphosphate (Ca(PO$_3$)$_2$), calcium pyrophosphate (Ca$_2$P$_2$O$_7$), calcium orthophosphite (CaHPO$_3$), calcium tetraborate (CaB$_4$O$_7$), calcium metaborate (Ca(BO$_2$)$_2$), calcium fluoride (CaF$_2$), calcium sulfite (CaSO$_3$), calcium oxalate (CaC$_2$O$_4$), calcium citrate (Ca$_3$(C$_6$H$_5$O)$_2$), aluminum hydroxide (Al(OH)$_3$), aluminum silicate (Al$_2$O$_3$.SiO$_2$ or 3Al$_2$O$_3$.2SiO$_2$), aluminum orthophosphate (AlPO$_4$), aluminum fluoride (AlF$_3$), aluminum oxalate (Al$_2$(C$_2$O$_4$)$_3$), magnesium hydroxide (Mg(OH)$_2$), magnesium carbonate (MgCO$_3$), magnesium metasilicate (MgSiO$_3$), magnesium orthosilicate (Mg$_2$SiO$_4$), magnesium orthophosphate (Mg$_3$(PO$_4$)$_2$), magnesium monohydrogen orthophosphate (MgHPO$_4$), magnesium pyrophosphate (Mg$_2$P$_2$O$_7$), magnesium orthophosphite (MgHPO$_3$), magnesium metaborate (Mg(BO$_2$)$_2$), magnesium orthoborate (Mg$_3$(BO$_2$)$_2$), magnesium fluoride (MgF$_2$), magnesium oxalate (MgC$_2$O$_4$), beryllium hydroxide (Be(OH)$_2$), beryllium carbonate (BeCO$_3$), beryllium orthosilicate (Be$_2$SiO$_4$), copper (II) hydroxide (Cu(OH)$_2$), copper (II) carbonate (CuCO$_3$), copper (II) orthophosphate (Cu$_3$(PO$_4$)$_2$), copper (I) fluoride (CuF), copper (II) oxalate (CuC$_2$O$_4$), copper citrate (Cu$_2$C$_6$H$_4$O$_7$), strontium hydroxide (Sr(OH)$_2$), strontium sulfate (SrSO$_4$), strontium carbonate (SrCO$_3$), strontium metosilicate (SrSiO$_2$), strontium orthosilicate (SrSiO$_4$), strontium orthophosphate (Sr$_3$(PO$_4$)$_2$), strontium monohydrogen orthophosphate (SrHPO$_4$), strontium tetraborate (SrB$_4$O$_7$), strontium fluoride (SrF$_2$), strontium sulfite (SrSO$_3$), strontium oxalate (SrC$_2$O$_4$), barium sulfate (BaSO$_4$), barium carbonate (BaCO$_3$), barium metasilicate (BaSiO$_3$), barium monohydrogen orthophosphate (BaHPO$_4$), tribarium orthophosphate (Ba$_3$(PO$_4$)$_2$), barium hypophosphate (BaPO$_3$), barium pyrophosphate (Ba$_2$P$_2$O$_7$), barium fluoride (BaF$_2$), barium sulfite (BaSO$_3$), barium oxalate (BaC$_2$O$_4$), barium citrate (Ba$_3$(C$_6$H$_5$O$_7$)$_2$), zinc hydroxide (Zn(OH)$_2$), zinc carbonate (ZnCO$_3$), zinc silicate (2ZnOSiO$_2$), zinc metasilicate (ZnSiO$_3$), zinc orthosilicate (Zn$_2$SiO$_4$), zinc orthophosphate (Zn$_3$(PO$_4$)$_2$), zinc pyrophosphate (Zn$_2$P$_2$O$_7$), zinc sulfite (ZnSO$_3$), zinc oxalate (ZnC$_2$O$_4$), zinc citrate (Zn$_3$(C$_6$H$_5$O$_7$)$_2$), cadmium hydroxide (Cd(OH)$_2$), cadmium carbonate (CdCO$_3$), cadmium metasilicate (CdSiO$_3$), cadmium orthophosphate (Cd$_3$(PO$_4$)$_2$), cadmium pyrophosphate (Cd$_2$P$_2$O$_7$), cadmium dihydrogen phosphate (Cd(H$_2$PO$_4$)$_2$), cadmium sulfite (CdSO$_3$), cadmium oxalate (CdC$_2$O$_4$), scandium hydroxide (Sc(OH)$_3$), gallium hydroxide (Ga(OH)$_3$), gallium fluoride (GaF$_3$), gallium oxalate (Ga$_2$(C$_2$O$_4$)$_3$), indium hydroxide (In(OH)$_3$), indium fluoride (InF$_3$), lanthanum hydroxide (La(OH)$_3$), lanthanum carbonate (La$_2$(CO$_3$)$_3$), lanthanum oxalate (La$_2$(C$_2$O$_4$)$_3$), manganese (II) hydroxide (Mn(OH)$_2$), manganese (III) hydroxide (Mn(OH)$_3$), manganese (II) carbonate (MnCO$_3$), manganese (II) metasilicate (MnSiO$_3$), manganese (II) monohydrogen orthophosphate (MnHPO$_4$), manganese (III) orthophosphate (MnPO$_4$), manganese (III) metaphosphate (Mn$_2$(PO$_3$)$_6$), manganese (II) pyrophosphate (Mn$_2$P$_2$O$_7$), manganese (II) orthophosphite (MnHPO$_3$), manganese (II) oxalate (MnC$_2$O$_4$), manganese (II) citrate (Mn$_3$(C$_6$H$_5$O$_7$)$_2$), iron (II) hydroxide (Fe(OH)$_2$), iron (II) carbonate (FeCO$_3$), iron (II) metasilicate (FeSiO$_3$), iron (II) orthosilicate (Fe$_2$SiO$_4$), iron (II) orthophosphate (Fe$_3$(PO$_4$)$_2$), iron (III) orthophosphate (FePO$_4$), iron (III) orthophosphate (FePO$_4$), iron (111) pyrophosphate (Fe$_4$(P$_2$O$_7$)$_3$), iron (III) hypophosphite (Fe(H$_2$PO$_2$)$_3$), iron (II) fluoride (FeF$_2$), iron (III) fluoride (FeF$_3$), iron (II) sulfite (FeSO$_3$), iron (II) oxalate (FeC$_2$O$_4$), iron (III) citrate (FeC$_6$H$_6$O$_7$), iron (III) citrate (FeC$_6$H$_5$O$_7$), cobalt (II) hydroxide (Co(OH)$_2$), cobalt (III) hydroxide (Co(OH)$_3$), cobalt (II) carbonate (CoCO$_3$), cobalt (III) carbonate (CO$_2$(CO$_3$)$_3$), cobalt (II) orthosilicate (CO$_2$SiO$_4$), cobalt (II) orthophosphate (Co$_3$(PO$_4$)$_2$), cobalt (II) sulfite (CoSO$_3$), cobalt (II) oxalate (CoC$_2$O$_4$), nickel hydroxide (Ni(OH)$_2$), nickel carbonate (NiCO$_3$), nickel orthophosphate (Ni$_3$(PO$_4$)$_2$), nickel sulfite (NiSO$_3$) and nickel oxalate (NiC$_2$O$_4$). Typically, because the calcium, magnesium and aluminum salts are preferred for use in the invention, the formulation includes one or more of the above calcium, magnesium or aluminum salts. The alkali metal and ammonium salts resulting from the reaction typically include one or more of sodium chloride, sodium sulfate, sodium nitrate, potassium chloride, potassium sulfate, potassium nitrate, ammonium chloride, ammonium sulfate or ammonium nitrate.

Some exemplary combinations of the alkali metal and ammonium salts or hydroxides and the Group IIA, Group IIIA, Group IIIB, copper, zinc, cadmium, manganese, iron, cobalt and nickel salts added to the formulation include the following: I+V, II+V, III+V, IV+V, I+IV+V, I+VI, II+VI, III+VI, I+VII, II+VII, and III+VII, wherein:

I. sodium hydroxide, sodium carbonate, sodium silicate and/or sodium phosphate;

II. potassium hydroxide, potassium carbonate, potassium silicate and/or potassium phosphate;

III. ammonium hydroxide, ammonium carbonate, ammonium silicate and/or ammonium phosphate;

IV. sodium sulfate, potassium sulfate and/or ammonium sulfate;

V. calcium chloride and/or calcium nitrate;

VI. magnesium chloride, magnesium nitrate and/or magnesium sulfate; and

VII. aluminum chloride, aluminum nitrate and/or aluminum sulfate.

More preferably, the first compound includes a sodium salt or hydroxide (e.g. NaOH) and the second compound includes calcium chloride and/or calcium nitrate.

Furthermore, the alkali metal and ammonium salts and hydroxides listed above and other alkali metal and ammonium salts can be combined with the Group IIA, Group IIIA, Group IIIB, copper, zinc, cadmium, manganese, iron, cobalt and nickel salts listed above or any other Group IIA, Group IIIA, Group IIIB, copper, zinc, cadmium, manganese, iron, cobalt and nickel salts in many other combinations in accordance with the invention to provide the desired pH and a Group IIA, Group IIIA, Group IIIB, copper, zinc, cadmium, manganese, iron, cobalt and nickel salt or hydroxide having a low solubility in water. The salts and hydroxides added to the formulation are substantially free of water-insoluble compounds having a solubility in water at 20° C. of less than about 0.5 g/100 mL such as Portland cement, lime, Plaster of Paris, fly ash, limestone dust, stone dust, and the like. For example, the salts and hydroxides added to the formulation contain less than 5%, more preferably less than 1%, by weight of these components based on the total weight of the salts and hydroxides added.

The present invention further includes a method of preparing an asphalt-based formulation, comprising mixing aggregate, water, an asphalt emulsion, at least one alkali metal or ammonium salt or hydroxide in aqueous solution, and at least one Group IIA, Group IIIA, Group IIIB, copper, zinc, cadmium, manganese, iron, cobalt or nickel salt in aqueous solution. Typically, the components are mixed in a mixing truck prior to application to a road surface. The formulation is preferably prepared by first wetting the aggregate with water. The order of addition after wetting the aggregate is not critical. The formulation can be prepared by mixing an aqueous solution of the at least one alkali metal or ammonium salt or hydroxide and an aqueous solution of the at least one Group IIA, Group IIIA, Group IIIB, copper, zinc, cadmium, manganese, iron, cobalt or nickel salt to the wetted aggregate, followed by addition of the asphalt emulsion to produce the formulation. Alternatively, an aqueous solution of the at least one alkali metal or ammonium salt or hydroxide can be added to the wetted aggregate in a first step followed by addition of the at least one Group IIA, Group IIIA, Group IIIB, copper, zinc, cadmium, manganese, iron, cobalt or nickel salt and the asphalt emulsion to the wetted aggregate in a second step, with the at least one Group IIA, Group IIIA, Group IIIB, copper, zinc, cadmium, manganese, iron, cobalt or nickel salt dissolved in the aqueous phase of the asphalt emulsion. The first and second steps can also be reversed. The Group IIA, Group IIIA, Group IIIB, copper, zinc, cadmium, manganese, iron, cobalt and nickel salts can be added either directly to the asphalt emulsion or added to a latex formulation that is subsequently added to the asphalt emulsion. Furthermore, when a latex is used, it can be added with the at least one Group IIA, Group IIIA, Group IIIB, copper, zinc, cadmium, manganese, iron, cobalt or nickel salt to the wetted aggregate followed by addition of an aqueous solution of the at least one alkali metal or ammonium salt or hydroxide, and then the asphalt emulsion.

The asphalt-based formulation produced by mixing the components described above, includes aggregate; water; asphalt dispersed in the water; at least one alkali metal or ammonium hydroxide or salt; and at least one salt or hydroxide of the Group IIA elements, the Group IIIA elements, the Group IIIB elements, copper, zinc, cadmium, manganese, iron, cobalt and nickel. For example, the asphalt-based formulation produced by mixing the components described above can include 100 parts by weight aggregate, from about 6 to about 30 parts by weight water, from about 3 to about 20 parts by weight of asphalt, from greater than 0 to about 4 parts by weight of alkali metal and ammonium salts and hydroxides and from greater than 0 to about 2 parts by weight of Group IIA, Group IIIA, Group IIIB, copper, zinc, cadmium, manganese, iron, cobalt and nickel salts and hydroxides. Typically, the asphalt-based formulation includes 100 parts by weight aggregate, from about 12 to about 22 parts by weight water, from about 6 to about 10 parts by weight of the asphalt emulsion, from about 0.005 to about 3 parts by weight of alkali metal and ammonium salts and hydroxides and from about 0.001 to about 1 part by weight of Group IIA, Group IIIA, Group IIIB, copper, zinc, cadmium, manganese, iron, cobalt and nickel salts and hydroxides. In addition, in the case of polymer modified asphalt emulsions, the copolymer can be present in the formulation in an amount of from about 0.05 to about 1 part by weight, typically from about 0.1 to about 0.5 parts by weight.

The alkali metal or ammonium salts or hydroxides in the mixed asphalt-based formulation include the salts formed by the reaction between the salts and hydroxides added to the formulation as discussed above. Excess alkali metal and ammonium salts and hydroxides added to the formulation such as sodium hydroxide are typically also present, particularly if necessary to maintain the pH of the formulation at a pH of at least about 9. The mixed formulation also includes at least one Group IIA, Group IIIA, Group IIIB, copper, zinc, cadmium, manganese, iron, cobalt or nickel salt or hydroxide having low water solubility, e.g., a solubility in water at 20° C. of less than about 0.5 g/100 mL, and exemplary salts and hydroxides are mentioned above. The Group IIA, Group IIIA, Group IIIB, copper, zinc, cadmium, manganese, iron, cobalt and nickel salts added to the formulation (e.g. calcium chloride) can also be present in small amounts.

Once the formulation is mixed, it can be applied to the surface to be paved. For example, the formulation can be mixed by a mixing truck and spread onto the surface by a paving truck. The formulation of the invention is typically mixed for from about 10 to 30 seconds prior to application to the surface to be paved. Preferably, for microsurfacing applications, the formulation has a mix time (defined by the maximum amount of time that it can be mixed before it experiences a rapid increase in viscosity) of at least 2 minutes, and for slurry seal applications, a mix time of at least 3 minutes, to allow adequate time for the formulation to be applied to the surface. Once mixed, the formulation is preferably applied to a surface at a thickness of no more than about 1 inch for rut filling applications (where microsurfacing formulations are used), and preferably applied to a surface at a thickness of no more than 1 cm for surface seal applications (where microsurfacing or slurry seal formulations can be used). The formulation is then allowed to cure to produce a paved surface suitable for vehicular use. Preferably, the curing time is no more than about one hour to allow the paved surface to be opened to traffic quickly to minimize inconvenience to drivers. In curing, the water is removed from the system resulting in a pavement formulation comprising aggregate; asphalt; alkali metal and ammonium salts and hydroxides; Group IIA, Group IIIA, Group IIIB, copper, zinc, cadmium, manganese, iron, cobalt and nickel salts and hydroxides; and optionally polymer (originally added to the asphalt emulsion).

As shown above, there are a number of possible combinations of alkali metal and ammonium salts and hydroxides and Group IIA, Group IIIA, Group IIIB, copper, zinc, cadmium, manganese, iron, cobalt and nickel salts that can be used in accordance with the invention. Therefore, there is a lot of flexibility in the method of the present invention in selecting salts for the preparation of the cold paving formulations. In addition, the amounts of each salt used can affect the resulting formulations. In particular, it has been discovered that the mix time and curing behavior of the cold paving formulations can be controlled by the amount of alkali metal and ammonium salts and hydroxides and the amount of Group IIA, Group IIIA, Group IIIB, copper, zinc, cadmium, manganese, iron, cobalt and nickel salts added to the formulations. For example, the amount of alkali metal and ammonium salts and hydroxides (e.g. NaOH) can been shown to directly affect the curing behavior of the formulation by increasing the mix time as shown in the examples provided below. In addition, the amount of Group IIA, Group IIIA, Group IIIB, copper, zinc, cadmium, manganese, iron, cobalt and nickel salts can directly affect the mix time of the formulation and final strength of the resulting pavement layer. Thus, the invention allows some control of formulation properties such as the mix time and the curing behavior, and even properties of the resulting pavement such as strength and durability.

By providing flexibility in the choice of alkali metal and ammonium salts and hydroxides, and Group IIA, Group IIIA, Group IIIB, copper, zinc, cadmium, manganese, iron, cobalt and nickel salts, used in the invention and the amounts used in the invention, the present invention also provides increased flexibility over conventional formulations with respect to the choice of aggregate types, asphalt types, type and amount of the surfactants used to produce the asphalt emulsion, asphalt emulsion pH's and application temperatures, while still providing good mix times and curing behavior. In addition, the formulation of the invention can be specifically tailored to address certain problems such as tenderness, rutting, and the like. Therefore, the invention allows greater flexibility than conventional processes.

The composition of the present invention can pass wet track abrasion loss for a microsurfacing system as is described in ISSA Technical Bulletin #100. The wet track abrasion loss that can be obtained is an amount that is not greater than 807.3 g/m$^2$ (75 g/ft$^2$).

It has also been found that the composition of the present invention can be used as an asphalt-based coating composition. These compositions can be used to form an asphalt-based coating on a substrate. A preferred application would be as a roof coating or as a water-proofing membrane.

The coating can be applied by any know method of coating, which includes, but is not limited to, brushing, wiping, rolling, dipping, flow coating, and spraying.

The fast-setting (gelling) that can be obtained with the asphalt-based coating composition of the present invention allows for early property development in a coating formed from the composition. This results in early water resistance or the ability to traffic on the coating.

As used throughout, ranges are used as a shorthand for describing each and every value that is within the range. Any value within the range can be selected as the terminus of the range.

The present invention will now be further described by the following non-limiting examples. Except where otherwise indicated, percentages are on a per weight basis and solutions are aqueous solutions. The ISSA TB-139 cohesion test was used to determine all cohesion values.

COMPARATIVE EXAMPLE 1

The effects of Portland cement on the open time and curing behavior of a microsurfacing formulation were demonstrated without the use of aggregate. In particular, a polymer modified asphalt emulsion was prepared containing approximately 65% asphalt content by weight (using AC-20 asphalt from Ergon, Inc.). The asphalt emulsion also included 3% by weight BUTONAL® NX1118 (a cationic SBR latex) and 0.75% by weight of each of REDICOTE®E9A and REDICOTE® C404 cationic surfactants (commercially available from Akzo Nobel) based on the weight of asphalt. Twelve grams of the polymer modified asphalt emulsion was combined with 1 g of Portland cement. The emulsion maintained its original low viscosity for 30 seconds to 2 minutes followed by a sharp increase in the emulsion viscosity. The emulsion solidified within 5 minutes. The emulsion pH was originally between 1.0 and 1.5 and reached 12–13 upon the addition of the Portland cement. It is noted that lime addition to the asphalt emulsion exhibits the same behavior.

COMPARATIVE EXAMPLE 2

Twelve grams of the polymer modified asphalt emulsion described in Comparative Example 1 was combined with 0.6 g of a 10% NaOH solution to increase the pH from between 1.0 and 1.5 to between 12 and 13. The emulsion viscosity increased immediately without any mix time.

EXAMPLE 1

Twelve grams of the polymer modified asphalt emulsion described in Comparative Example 1 was combined with 13 mg of CaCl$_2$ and 0.6 g of a 10% NaOH solution to increase the pH from between 1.0 and 1.5 to between 12 and 13. Much like with Portland cement addition, the emulsion maintained its original low viscosity for 30 seconds to 2 minutes followed by a sharp increase in the emulsion viscosity, and solidified within 5 minutes.

EXAMPLE 2

A polymer modified asphalt emulsion was prepared by the method discussed in Comparative Example 1 except that the BUTONAL®NX1118 further contained 5% CaCl$_2$ by weight. Twelve grams of the polymer modified asphalt emulsion (which included the equivalent of 15 mg CaCl$_2$) was combined with 0.6 g of 10% NaOH. There was a gradual viscosity build-up in the formulation for 30 seconds to 2 minutes of mixing followed by a rapid increase in the viscosity similar to what occurs with Portland cement addition.

EXAMPLE 3

100 grams of Delta aggregate (ISSA Type II aggregate for microsurfacing commercially available from Capitol Aggregates) was mixed with 10 g water and 0.6 g of 10% NaOH solution, and then mixed with 12 g of the asphalt emulsion described in Example 2. The formulation had a mix time of 140 seconds, followed by rapid viscosity build-up.

EXAMPLE 4

The same procedure was used as described in Example 3 except that only 0.3 g of 10% NaOH was added to the mixture. The resulting formulation had a very gradual viscosity build-up with a mix time of above 400 seconds.

EXAMPLE 5

The same procedure was used as described in Example 3 except that 1.0 g of 10% NaOH was added to the mixture. The mix time of the formulation was 180 seconds, followed by a rapid viscosity build-up and setting.

COMPARATIVE EXAMPLE 3

One gram of Portland cement was added to 100 g of Delta aggregate and mixed with 10 g water. The wetted aggregate was then combined with the asphalt emulsion described in Comparative Example 1. The formulation had a mix time of 130 seconds, and developed more than 20 kg-cm cohesion after 1 hour.

EXAMPLE 6

100 g BUTONAL® NX1118 was combined with 4 g calcium chloride to produce a latex having a total solids content of 65%. 0.36 g of this latex was added into 12 g of an asphalt emulsion containing approximately 65% asphalt content by weight (using AC-20 asphalt from Ergon, Inc.) and 0.75% by weight of each of REDICOTE® E9A and REDICOTE® C-404 cationic surfactants (commercially available from Akzo Nobel) based on the weight of asphalt to produce a modified asphalt emulsion containing 3% BUTONAL® NX1118 and 14 mg calcium carbonate. 100 g of Delta aggregate was mixed with 10 g water, and 0.8 g of 10% NaOH solution was added. After mixing together, the polymer modified asphalt emulsion was added to the aggregate. The resulting formulation had a mix time of 120 seconds and developed 18 kg-cm cohesion after 1 hour.

EXAMPLE 7

A formulation was prepared by the same procedure described in Example 6 except that 9 g of calcium chloride was added to the 100 g BUTONAL® NX1118. The formulation had a mix time of 145 seconds and developed cohesion of above 20 kg-cm after 1 hour.

EXAMPLE 8

100 g of Delta aggregate was wetted with 10 g water, then 0.8 g of a 10% NaOH solution and 0.8 g of a 10% $CaCl_2$ solution were added. After mixing, 12 g of the asphalt emulsion described in Comparative Example 1 was added and the formulation was mixed. The resulting formulation had a mix time of 100 seconds and developed cohesion of 18 kg-cm after 1 hour.

EXAMPLE 9

A formulation was prepared by the same procedure described in Example 8 except that 100 g of low reactivity Blue Circle aggregate (an ISSA Type II aggregate for microsurfacing commercially available from Blue Circle) was used in the formulation. The resulting formulation had a mix time of 80 seconds and a cohesion value of above 25 kg-cm after 1 hour.

EXAMPLE 10

A formulation was prepared by the same procedure described in Example 8 except that 0.83 g of a 10% $Al_2(SO_4)_3.18H_2O$ solution, 0.78 g of a 10% NaOH solution and 0.8 g of a 10% $CaCl_2$ solution were added. The resulting formulation had a mix time of 90 seconds and a cohesion value of 17 kg-cm after 1 hour.

COMPARATIVE EXAMPLE 4

A formulation was prepared by the same procedure described in Example 8 except that 1.0 g of Portland cement was used instead of the 10% NaOH and 10% $CaCl_2$ solutions. The formulation had a mix time of 190 seconds a cohesion value of 18 kg-cm after 1 hour.

COMPARATIVE EXAMPLE 5

The asphalt emulsion described in Comparative Example 1 was prepared except that 1.5% by weight INDULIN® QTS cationic quick set emulsifier from Westvaco, Inc. was used as the surfactant. The emulsion pH was 1.0. The formulation was prepared using this asphalt emulsion according to the procedure discussed in Comparative Example 3. The resulting formulation had a mix time of 60 seconds and developed a cohesion value of above 20 kg-cm after 1 hour.

EXAMPLE 11

A formulation was prepared by the procedure described in Comparative Example 5 except that 0.8 g of 10% NaOH solution and 0.8 g of 10% $CaCl_2$ solution were added to wet aggregate instead of Portland cement. The resulting formulation had a mix time of 130 seconds and a cohesion value of above 20 kg-cm after 1 hour.

COMPARATIVE EXAMPLE 6

A formulation was prepared by the procedure described in Comparative Example 5 except the low reactivity Blue Circle aggregate was used. The resulting formulation had a mix time of 10 seconds and a cohesion value of above 20 kg-cm after 1 hour.

EXAMPLE 12

A formulation was prepared by the procedure described in Example 11 except Blue Circle aggregate was used. The resulting formulation had a mix time of 60 seconds and a cohesion value of above 20 kg-cm after 1 hour.

EXAMPLE 13

100 g of Delta aggregate was wetted with 10 g water, then 7 g of a 10% $Na_3PO_4.12H_2O$ solution and 0.8 g of a 10% $CaCl_2$ solution were added. After mixing, 12 g of the asphalt emulsion described in Comparative Example 1 was added and the formulation was mixed. The resulting formulation had a pH above 11, a mix time of 340 seconds and a cohesion value of 17 kg-cm after 1 hour.

EXAMPLE 14

An unmodified asphalt emulsion was prepared containing approximately 65% asphalt content by weight (using AC-20 asphalt from Ergon, Inc.). The asphalt emulsion also included 0.75% by weight of an equal blend of REDICOTE® E9A and REDICOTE® C-404 cationic surfactants based on the weight of asphalt. 100 g Blue Circle aggregate was wetted with 10 g water and mixed with the unmodified asphalt emulsion. 0.8 g of a 10% NaOH solution and 0.8 g of a 10% $CaCl_2$ solution were added in the mix. The resulting formulation had a mix time of 140 seconds and a cohesion value of 12 kg-cm after 30 minutes.

EXAMPLE 15

The asphalt emulsion described in Comparative Example 1 was prepared except that an appropriate amount of REDICOTE® C-404 was added such that the emulsion included 1.25% of REDICOTE® C-404 and 0.75% of REDICOTE® E9A based on the weight of asphalt in the emulsion. 100 g of Delta aggregate having a high fines content was wetted with 10 g water, and then 0.8 g of a 10% $Na_2CO_3$ solution and 0.8 g of a 10% $CaCl_2$ solution were added. The pH of the resulting formulation remained below 9 and the mix did not set even after 10 minutes of mixing. A small amount (0.3 to 0.5 g) of a 10% NaOH solution was added and the formulation immediately set.

EXAMPLE 16

A formulation was prepared by the procedure described in Example 15 except that 0.8 g of a 10% NaOH solution was also added with the other solutions. The resulting formulation had a pH of above 11, a mix time of 160 seconds and a cohesion value of above 20 kg-cm after 1 hour.

EXAMPLE 17

A formulation was prepared by the procedure described in Example 15 except that 11.0 g of the 10% $Na_2CO_3$ solution and 1.2 g of the 10% $CaCl_2$ solution were used. The formulation pH was above 11 and had a mix time of 480 seconds.

EXAMPLE 18

A formulation was prepared by the procedure described in Example 15 except that 0.9 g of a 10% $Na_2SiO_3$ solution was used instead of 0.8 g of a 10% $Na_2CO_3$ solution. The resulting formulation has a pH below 9 and did not set even after 10 minutes of mixing. After about 0.2 g of 10% NaOH solution was added, the mix immediately set.

EXAMPLE 19

A formulation was prepared by the procedure described in Example 18 except that 0.8 g of a 10% NaOH solution was added with the other solutions. The resulting formulation had a pH of above 11, a mix time of 90 seconds and a cohesion value of above 20 kg-cm after 1 hour.

EXAMPLE 20

A formulation was prepared by the procedure described in Example 18 except that 1.9 g of the 10% $Na_2SiO_3$ solution and 1.2 g of the 10% $CaCl_2$ solution were used. The resulting formulation had a pH above 11 and a mix time of 150 seconds.

EXAMPLE 21

A formulation was prepared by the procedure described in Example 18 except that 2.4 g of a 10% $Na_2SO_4$ solution, 1.4 g of a 10% $CaCl_2$ solution and 0.8 g of a 10% NaOH solution were used. The formulation had a mix time of 120 seconds and a cohesion value of 15 kg-cm after 1 hour.

EXAMPLE 22

100 g of the Delta aggregate used in Example 15 was washed to reduce the fines content in the aggregate and to increase the mix time of the resulting formulation. The aggregate was wetted with 10 g water, and 0.45 g of a 10% $Na_2SiO_3$ solution, 0.4 g of a 10% $Na_2CO_3$ solution, 3.0 g of a 10% $Na_3PO_4.12H_2O$ solution, and 0.8 g of a 10% $CaCl_2$ solution were added. After mixing, 12 g of the asphalt emulsion described in Comparative Example 1 was added. The resulting formulation had a mix time of 105 seconds and a cohesion value of 17 kg-cm after 1 hour.

EXAMPLE 23

In this example, the wet track abrasion loss according to ISSA Technical Bulletin #100 was measured for a control sample that contained cement, and for three compositions prepared according to the present invention. First, 800 grams of Delta aggregate were mixed with the amount of water given in Table 1. Next break modifiers were added to the water/aggregate mixture. Next, 88 g of asphalt emulsion were added to the mixture. The asphalt emulsion contained 67.5% by weight asphalt (AC-20 asphalt from Ergon, Inc.). The asphalt emulsion also contained 3% by weight BUTONAL® NX1118 SBR latex, and 1% by weight of REDICOTE® C-450 cationic surfactant based on the weight of the asphalt. The surfactants had a pH of 1.0, and the resulting asphalt emulsion had a pH of 2.0. The wet track abrasion loss and the break time for each sample are given in Table 1 below. The break time was measured after 2 minutes of mixing the samples. Additionally, identical samples were prepared with the exception that the aggregate was not included. The break time of these compositions were measured, and the results are listed in Table 1 below.

TABLE 1

|  | Control | A | B | C |
|---|---|---|---|---|
| Water | 100 g | 85 g | 81 g | 38 g |
| Break Modifier | Cement | 10% | 10% | 10% |
| (Amount) | (8 g) | NaOH (8.8 g) 10% $CaCl_2$ (6.4 g) | $Na_2CO_3$ (6.4 g) 10% $CaCl_2$ (6.4 g) 10% NaOH (6.4 g) | $Na_3PO_4*12H_2O$ (56 g) 10% $CaCl_2$ (6.4 g) |
| Wet track abrasion loss g/m² (g/ft²) | 1818 (168.9) | 207.7 (19.3) | 388.6 (36.1) | not tested |
| Break time of emulsions without aggregate | 30–40 s | 40–50 s | 1–2 min | 2–3 min |

The results in Table 1 show that the cement free compositions have a lower wet track abrasion loss than the samples that contained only cement. Of the non-cement containing compositions, the $NaOH/CaCl_2$ break modifier composition provided the fastest break time. All systems "pushed" water out.

It is understood that upon reading the above description of the present invention, one skilled in the art could make changes and variations therefrom. These changes and variations are included in th spirit and scope of the following appended claims.

What is claimed is:

1. A cationic asphalt-based formulation formed by mixing:
   water;
   a cationic asphalt emulsion;
   at least one first compound in aqueous solution selected from the group consisting of alkali metal salts, alkali metal hydroxides, ammonium salts and ammonium hydroxide; and
   at least one second compound in aqueous solution selected from the group consisting of Group IIA salts, Group IIIA salts, Group IIIB salts, copper salts, zinc salts, cadmium salts, manganese salts, iron salts, cobalt salts and nickel salts.

2. The formulation according to claim 1 further comprising aggregate.

3. The formulation according to claim 1, wherein the water is mixed in an amount of from about 4 to about 16 parts by weight the cationic asphalt emulsion is mixed in an amount from about 8 to about 25 parts by weight, the at least one first compound is mixed in an amount from greater than 0 to about 4 pans by weight, and the at least one second compound is mixed in an amount from greater than 0 to about 2 parts by weight.

4. The formulation according to claim 2, wherein said aggregate is mixed in an amount of 100 parts by weight, the water is mixed in an amount of from about 4 to about 16 parts by weight, the cationic asphalt emulsion is mixed in an amount from about 8 to about 25 parts by weight, the at least one first compound is mixed in an amount from greater than 0 to about 4 parts by weight, and the at least one second compound is mixed in an amount from greater than 0 to about 2 parts by weight.

5. The formulation according to claim 1, wherein the water is mixed in an amount of from about 8 to about 15 parts by weight, the cationic asphalt emulsion is mixed in an amount from about 10 to about 15 parts by weight, the at least one first compound is mixed in an amount from about 0.005 to about 3 pans by weight, and the at least one second compound is mixed in an amount from about 0.001 to about 1 part by weight.

6. The formulation according to claim 1, wherein the at least one first compound in aqueous solution comprises more than one first compound provided in one or more aqueous solutions.

7. The formulation according to claim 1, wherein the at least one second compound in aqueous solution comprises more than one second compound provided in one or more aqueous solutions.

8. The formulation according to claim 1, wherein the at least one first compound and the at least one second compound have solubilities in water at 20 C. of 10 g/100 mL.

9. The formulation according to claim 1, wherein the at least one first compound comprises at least one compound selected from the group consisting of salts and hydroxides of sodium, potassium and ammonium.

10. The formulation according to claim 9, wherein the at least one first compound comprises at least one compound selected from the group consisting of hydroxides, sulfites, carbonates, silicates, phosphates, phosphites, borates, fluorides, sulfites, oxalates and citrates of sodium, potassium and ammonium.

11. The formulation according to claim 1, wherein said at least one first compound includes sodium hydroxide.

12. The formulation according to claim 1, wherein said at least one second compound includes at least one compound selected from the group consisting of chlorides, sulfates and nitrates of Group IIA elements, Group IIIA elements, Group IIIB elements, copper, zinc, cadmium, manganese, iron, cobalt and nickel.

13. The formulation according to claim 1, wherein said at least one second compound includes at least one compound selected from the group consisting of calcium salts, magnesium salts and aluminum salts.

14. The formulation according to claim 1, wherein said at least one second compound includes at least one compound selected from the group consisting of calcium chloride, calcium nitrate, magnesium chloride, magnesium nitrate, magnesium sulfate, aluminum chloride, aluminum nitrate, and aluminum sulfate.

15. The formulation according to claim 1, wherein the at least one second compound includes calcium chloride.

16. The formulation according to claim 1, wherein the at least one first salt includes a sodium salt or hydroxide and said at least one second compound includes a calcium salt.

17. The formulation according to claim 1, wherein the at least one first compound and the at least one second compound are substantially free of Portland cement and lime.

18. The formulation according to claim 1, wherein the at least one first compound and the at least one second compound react to produce at least one third compound selected from the group of salts and hydroxides of Group IIA elements, Group IIIA elements, Group IIIB elements, copper, zinc, cadmium, manganese, iron, cobalt and nickel, said at least one third compound having a solubility in water at 20 C. of 0.5 g/100 mL.

19. The formulation according to claim 1, wherein the at least one second compound includes at least one second compound included in the aqueous phase of the cationic asphalt emulsion.

20. The formulation according to claim 1, wherein the formulation has a pH of at least 9.

21. The formulation according to claim 1, wherein said cationic asphalt emulsion is a polymer modified cationic asphalt emulsion.

22. The formulation according to claim 21, wherein said polymer modified cationic asphalt emulsion includes at least one polymer selected from the group consisting of cationic SBR latices, natural rubber latices, polychloroprene latices, SBS block copolymers and EVA copolymers.

23. The formulation according to claim 21, wherein said polymer modified cationic asphalt emulsion includes a cationic SBR latex emulsion.

24. The formulation according to claim 1, wherein the cationic asphalt emulsion has a pH of greater than 1.5 prior to mixing.

25. The formulation according to claim 1, wherein the cationic asphalt emulsion has a pH of greater than 2.0 prior to mixing.

26. The formulation according to claim 1, wherein the cationic asphalt emulsion has a pH of greater than 3.0 prior to mixing.

27. A cationic asphalt-based formulation formed by mixing:
   water;
   a cationic asphalt emulsion;
   at least one compound in aqueous solution selected from the group consisting of alkali metal salts, alkali metal hydroxides, ammonium salts and ammonium hydroxide, said at least one compound having a solubility in water at 20° C. of 10 g/100 mL and capable of producing a pH in solution of at least; and at least one salt in aqueous solution having a solubility of 10 g/100 mL;
   wherein the at least one compound and the at least one salt react to form at least one salt or hydroxide having a solubility in water at 20° C. of $\leq 0.5$ g/100 mL.

28. The cationic asphalt-based formulation according to claim 27 further comprising aggregate.

29. The cationic asphalt-based formulation according to claim 27, wherein the at least one salt is selected from the group consisting of salts of Group IIA elements, Group IIIA elements, Group IIIB elements, copper, zinc, cadmium, manganese, iron, cobalt and nickel; and the at least one compound and the at least one salt react to form at least one compound selected from the group consisting of salts and hydroxides of Group IIA elements, Group IIIA elements, Group IIIB elements, copper, zinc, cadmium, manganese, iron, cobalt and nickel, having a solubility in water at 20° C. of $\leq 0.5$ g/100 mL.

30. A cationic asphalt-based formulation formed by mixing:
   from about 4 to about 16 parts by weight water;
   from about 8 to about 25 parts by weight of a cationic asphalt emulsion;
   from greater than 0 to about 4 parts by weight of at least one first compound in aqueous solution selected from the group consisting salts and hydroxides of sodium, potassium and ammonium; and
   from greater than 0 to about 2 parts by weight of at least one second compound in aqueous solution selected from the group consisting of calcium chloride, calcium nitrate, magnesium chloride, magnesium nitrate, magnesium sulfate, aluminum chloride, aluminum nitrate, and aluminum sulfate;
   said cationic asphalt-based formulation having a pH of $\geq 9$.

31. The cationic asphalt-based formulation according to claim 30 further comprising aggregate.

32. A cationic asphalt-based formulation, comprising
   water;
   cationic asphalt dispersed in the water;

at least one first compound selected from the group consisting of salts and hydroxides of alkali metals and ammonium, said at least one first compound including at least one alkali metal salt or ammonium salt product formed by the reaction of a first react having a solubility in water at 20° C. of $\geqq$10 g/100 mL selected from the group consisting of salts and hydroxides of alkali metals and ammonium and a second reactant selected from the group consisting of salts having a solubility in water at 20° C. of $\geqq$than about 10 g/100 mL; and at least one second compound formed by the reaction of said first reactant and said second reactant, said at least one compound selected from the group consisting of salts and hydroxides having a solubility in water at 20° C. of $\leqq$0.5 g/100 mL;

said formulation having a pH of at least 9.

33. The cationic asphalt-based formulation according to claim 32 further comprising aggregate.

34. A method of preparing a cationic asphalt-based formulation, comprising mixing water; a cationic asphalt emulsion; at least one first compound in aqueous solution selected from the group consisting of alkali metal salts, alkali metal hydroxides, ammonium salts and ammonium hydroxide; and at least one second compound in aqueous solution selected from the group consisting of Group IIA salts, Group IIIA salts, Group IIIB salts, copper salts, zinc salts, cadmium salts, manganese salts, iron salts, cobalt salts and nickel salts, to produce the cationic asphalt-based formulation.

35. The method according to claim 34 further comprising mixing aggregate.

36. A method of preparing a cationic asphalt-based formulation, comprising mixing:

water;

a cationic asphalt emulsion;

at least one compound in aqueous solution selected from the group consisting of alkali metal salts, alkali metal hydroxides, ammonium salts and ammonium hydroxide, said at least one compound having a solubility of greater than 10 g/100 mL and capable of producing a pH in solution of at least 9; and at least one salt in aqueous solution having a solubility in water at 20° C. of $\geqq$10 g/100 mL;

wherein the at least one compound and the at least one salt react to form at least one salt or hydroxide having a solubility in water at 20° C. of $\leqq$0.5 g/100 mL.

37. The method according to claim 36 further comprising mixing aggregate.

38. The method according to claim 36, wherein the at least one salt is selected from the group consisting of salts of Group IIA elements, Group IIIA elements, Group IIIB elements, copper, zinc, cadmium, manganese, iron, cobalt and nickel; and the at least one compound and the at least one salt react to form at least one compound having a solubility in water at 20° C. $\leqq$0.5 g/100 mL selected from the group consisting of salts and hydroxides of Group IIA elements, Group IIIA elements, Group IIIB elements, copper, zinc cadmium, manganese, iron, cobalt and nickel.

39. A method of preparing a cationic asphalt-based formulation, comprised mixing:

from about 4 to about 16 parts by weight water;

from about 8 to about 16 parts by weight of an cationic asphalt emulsion;

from greater than 0 to about 4 parts by weight of at least one first compound in aqueous solution selected from the group consisting salts and hydroxides of sodium, potassium and ammonium; and from greater than 0 to about 2 parts by weight of at least one second compound in an aqueous solution selected from the group consisting of calcium chloride, calcium nitrate, magnesium chloride, magnesium nitrate, magnesium sulfate, aluminum chloride, aluminum nitrate, and aluminum sulfate;

said cationic asphalt-based formulation having a sufficient amount of the at least one first compound to produce a pH of $\geqq$9.

40. The method according to claim 39 further comprising mixing 100 parts by weight aggregate.

* * * * *